(12) United States Patent
Ravi et al.

(10) Patent No.: US 9,879,096 B2
(45) Date of Patent: *Jan. 30, 2018

(54) PROCESS FOR PREPARATION OF SUGAMMADEX SODIUM

(71) Applicant: NEULAND LABORATORIES LIMITED, Hyderabad (IN)

(72) Inventors: Ponnaiah Ravi, Madurai (IN); Praveenkumar Neela, Hyderabad (IN); Batthini Guruswamy, Hyderabad (IN); Sribhashyam Ravikanth, Hyderabad (IN); Uppala Manikya Rao, Guntur (IN)

(73) Assignee: NEULAND LABORATORIES LIMITED, Hyderabad (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/767,907

(22) PCT Filed: Apr. 8, 2013

(86) PCT No.: PCT/IN2013/000233
§ 371 (c)(1),
(2) Date: Aug. 13, 2015

(87) PCT Pub. No.: WO2014/125501
PCT Pub. Date: Aug. 21, 2014

(65) Prior Publication Data
US 2016/0009827 A1    Jan. 14, 2016

(30) Foreign Application Priority Data
Feb. 14, 2013  (IN) ............................. 667/CHE/2013

(51) Int. Cl.
*C08B 37/16* (2006.01)

(52) U.S. Cl.
CPC ................................ *C08B 37/0012* (2013.01)

(58) Field of Classification Search
None
See application file for complete search history.

(56) References Cited

U.S. PATENT DOCUMENTS 5,569,756 A     10/1996  Qi et al.
6,670,340 B1 *  12/2003  Zhang .................. A61K 31/724
                                                  514/231.5

FOREIGN PATENT DOCUMENTS

WO    WO2012025937 A1    3/2012

OTHER PUBLICATIONS

Koval, Russian Journal of Organic Chemistry, 2007, vol. 43, No. 3, pp. 319-346.*
Chmurski K et al: An Improved Synthesis of 6-Deoxyhalo Cyclodextrins via Halomethylenemorpholinium Halides Vilsmeier-Haack Type Reagents; Oct. 20, 1997, pp. 7365-7368.

* cited by examiner

*Primary Examiner* — Layla D Berry
(74) *Attorney, Agent, or Firm* — Ling Wu; Stephen Yang; Ling and Yang Intellectual Property

(57) ABSTRACT

The present invention provides a process for the preparation of sugammadex sodium involving the step of: reacting 6-perdeoxy-6-per-halo-gamma-cyclodextrin with 3-mercapto propionic acid in the presence of alkali metal alkoxide in an organic solvents. The invention also provides a process for purifying the sugammadex or its pharmaceutically acceptable salts using water and organic solvents.

5 Claims, 1 Drawing Sheet

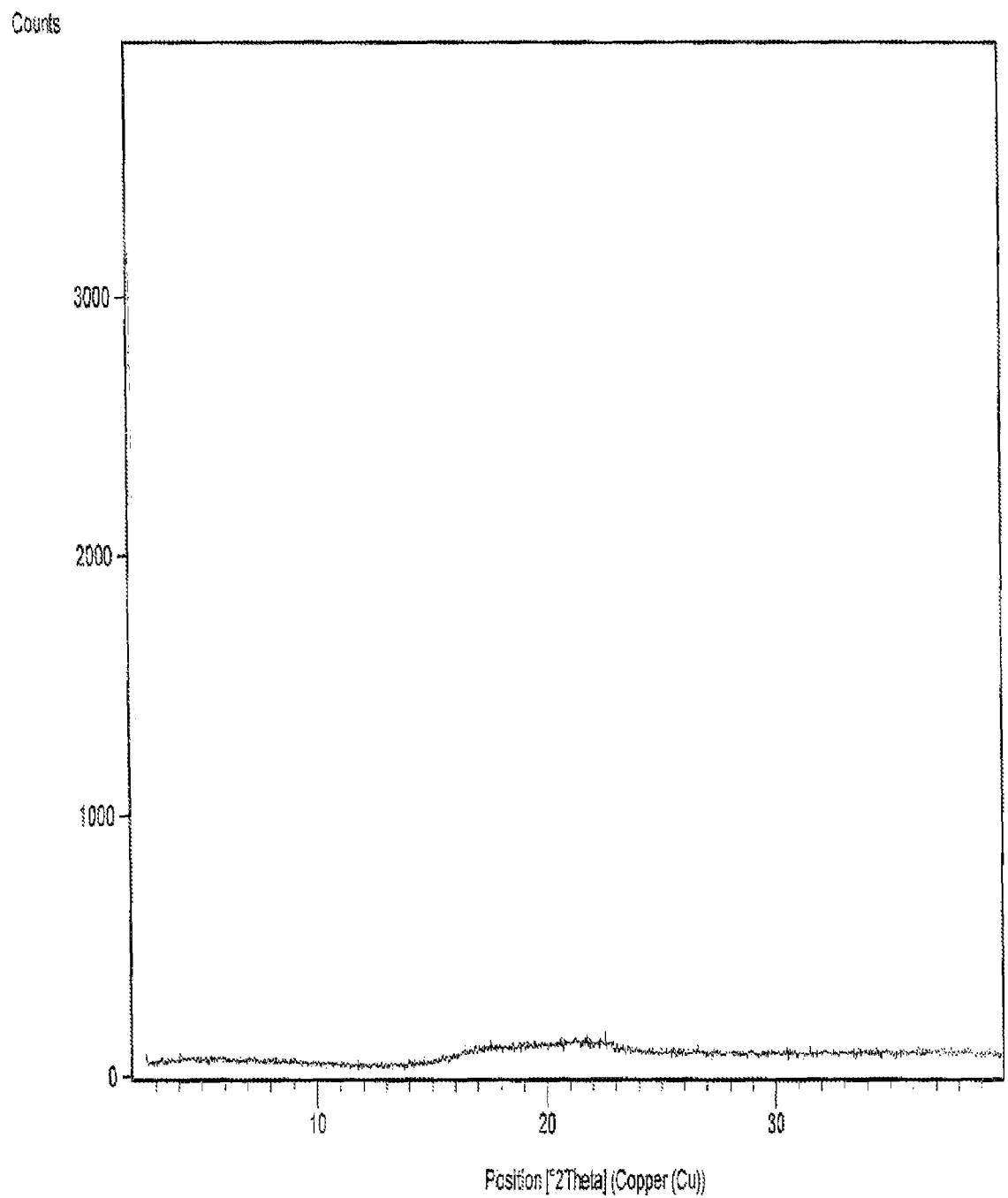

PROCESS FOR PREPARATION OF SUGAMMADEX SODIUM

FIELD OF THE INVENTION

The invention relates to an improved process for preparation of Sugammadex sodium. More particularly, invention relates to an improved process for preparation of Sugammadex sodium and purification of Sugammadex or its pharmaceutically acceptable salts.

BACKGROUND OF THE INVENTION

Sugammadex (Trade name: Bridion) is first disclosed in U.S. Pat. No. 6,670,340 assigned to Akzo Nobel. Sugammadex sodium was approved in EMEA as an agent for reversal of neuromuscular blockade by the agent rocuronium in general anaesthesia in 2008 and is the first selective relaxant binding agent (SRBA).

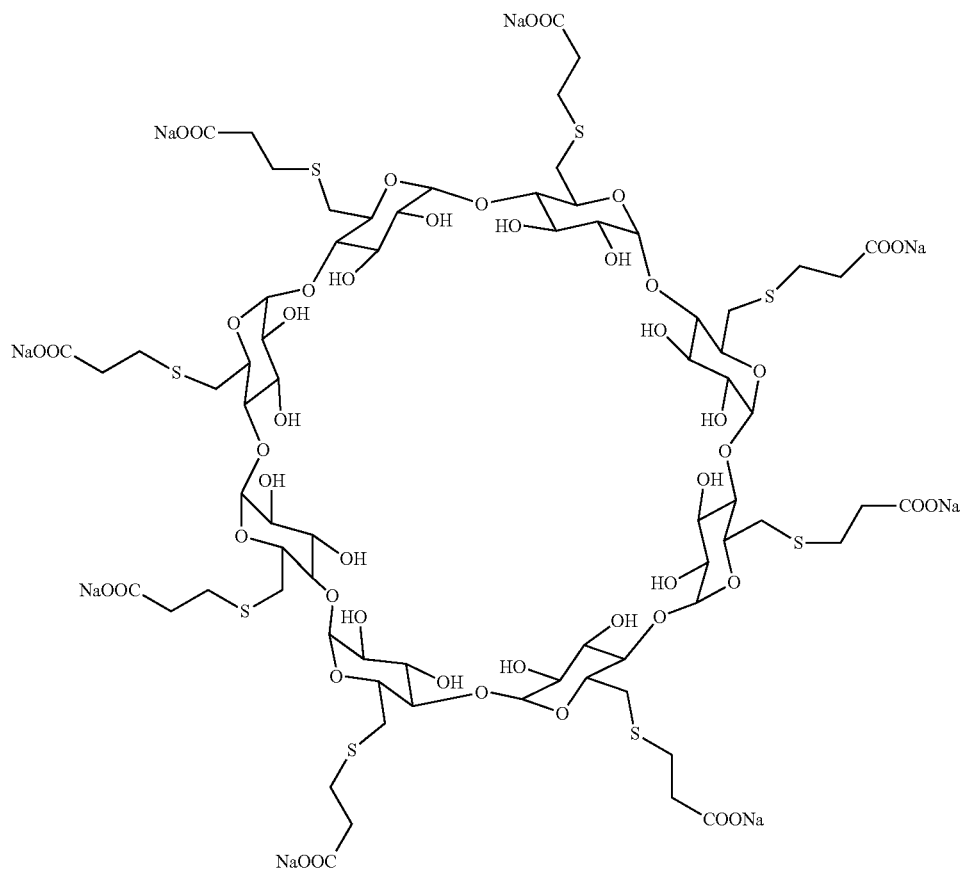

Sugammadex sodium contains 8 recurring glucose units each with 5 asymmetric carbon atoms, in total 40 asymmetric carbon atoms for the whole molecule. Sugammadex is a modified γ-cyclodextrin, with a lipophilic core and a hydrophilic periphery. The gamma cyclodextrin has been modified from its natural state by placing eight carboxyl thio ether groups at the sixth carbon positions.

The U.S. Pat. No. 6,670,340 assigned to Akzo Nobel discloses a process for preparing Sugammadex sodium as depicted in Scheme-I:

Scheme-I
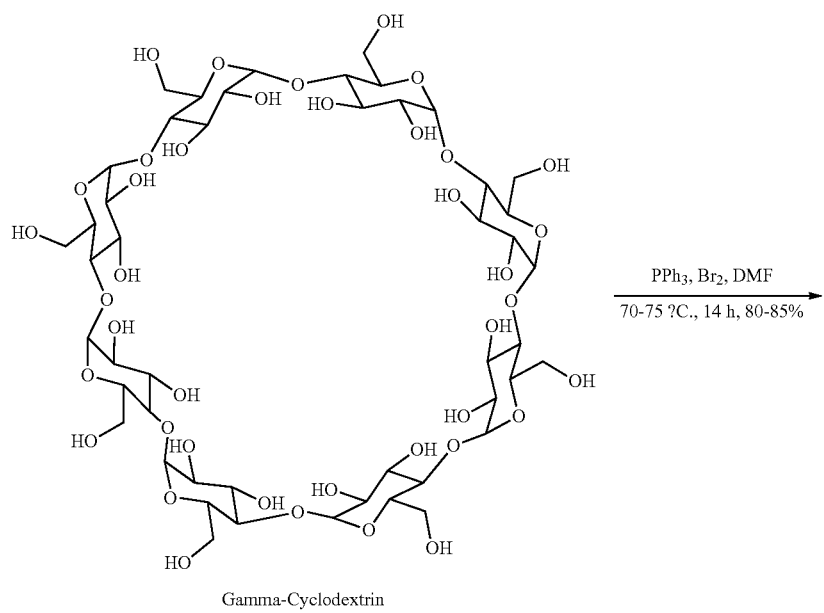
Gamma-Cyclodextrin
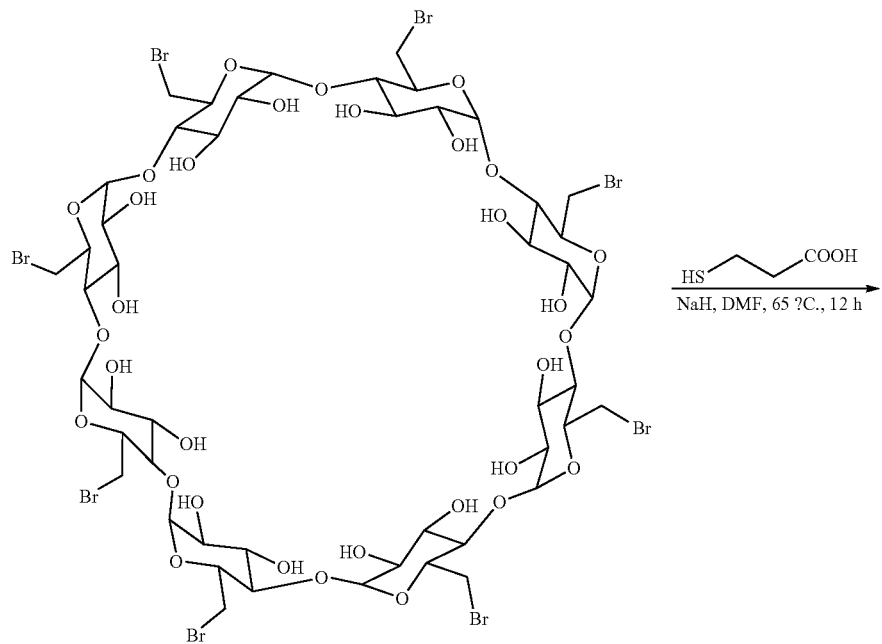

-continued

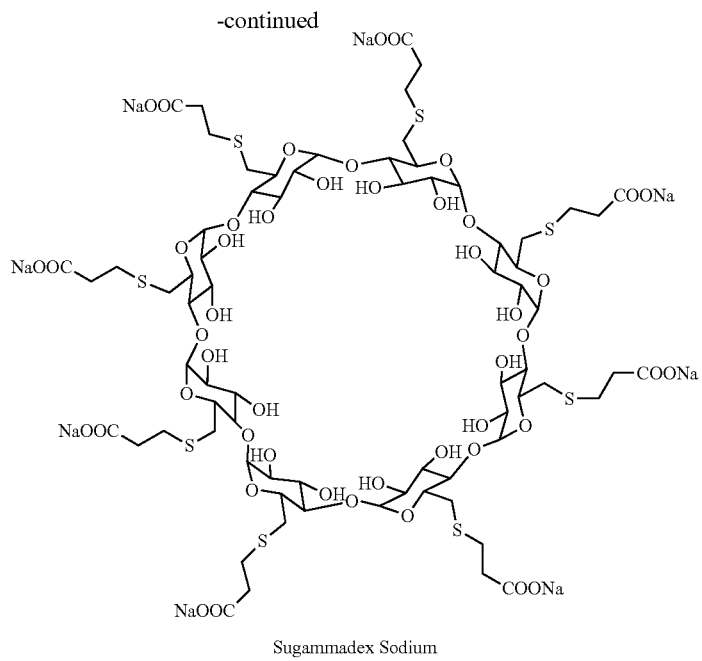

Sugammadex Sodium

The first step in the process in the scheme-I involves the preparation of Vilsmeier Hack reagent by the reaction of DMF, triphenylphosphine and Iodine. The triphenylphosphine oxide is formed as a byproduct of the first step. Removal of triphenylphosphine oxide from the product is very difficult from the reaction mass as it requires repeated washing with DMF under argon atmosphere, which leads to inconsistency in yield of final product Sugammadex.

The second step involves the reaction of 6-perdeoxy-6-per-Iodo-Gamma cyclodextrin with 3-mercapto propionic acid in presence of alkali metal hydrides in an organic solvent to give 6-per-deoxy-6-per-(2-carboxyethyl)thio-γ-cyclodextrin sodium salt.

The PCT publication WO2012/025937 discloses preparation of Sugammadex involving the reaction of gamma cyclodextrin with phosphorous halide in presence of organic solvent, thereby overcomes the formation of triphenyl phosphine oxide. The publication also discloses the use of 6-per deoxy-6-per-chloro-γ-cyclodextrin in the preparation of the Sugammadex.

The purification techniques in the prior arts employ column chromatographic/membrane dialysis techniques which are costly and not convenient in large scale operations.

Therefore, there exists a need for an improved and economically efficient process for the preparation of Sugammadex sodium.

OBJECT OF THE INVENTION

The primary object of the invention is to provide an improved process for preparation of Sugammadex sodium.

Another object of the invention is also to provide an improved process for purification of Sugammadex or its pharmaceutically acceptable salts.

SUMMARY OF THE INVENTION

Accordingly, in one embodiment, the invention provides a process for preparation of Sugammadex sodium, wherein the process comprises reacting 6-perdeoxy-6-per-halo-gamma-cyclodextrin with 3-mercapto propionic acid in presence of alkali metal alkoxide in an organic solvent.

In another embodiment, the invention provides a process for purification of Sugammadex or its salts comprising the steps of:

(i) dissolving Sugammadex or its salts in a mixture of water and water miscible solvent;

(ii) adding activated carbon to the solution obtained in step (i) and maintaining for a sufficient time;

(iii) filtering the contents of the mixture obtained in step (ii);

(iv) optionally, heating the filtrate obtained in step (iii);

(v) adding the water miscible solvent to the contents obtained in steps (iii) or (iv); and (vi) cooling the contents obtained in step (v) for sufficient time to obtain a solid.

BRIEF DESCRIPTION OF THE DRAWINGS

FIG. 1 depicts X-Ray Powder Diffraction (XRPD) pattern of Sugammadex sodium

DETAILED DESCRIPTION OF THE INVENTION

Detailed embodiments of the present invention are disclosed herein below. However, it is to be understood that the disclosed embodiments are merely exemplary of the invention, which can be embodied in various forms. The scope of the invention is not limited to the disclosed embodiments and terms and phrases used herein are not intended to be limiting but rather to provide an understandable description of the invention. The invention is defined by claims appended hereto.

In one embodiment, the invention provides an improved process for the preparation of Sugammadex sodium comprising the steps of:

(i) reacting gamma-cyclodextrin having the formula-I

Formula-I

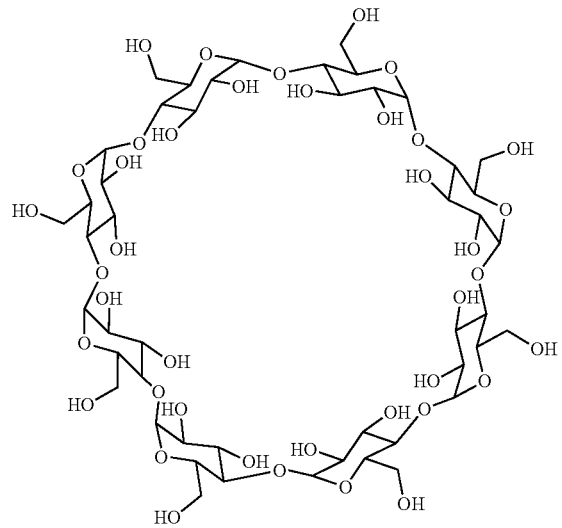
(I)

with phosphorous halide in an organic solvent to obtain 6-perdeoxy-6-per-halo Gamma Cyclodextrin having the formula-II Formula-II

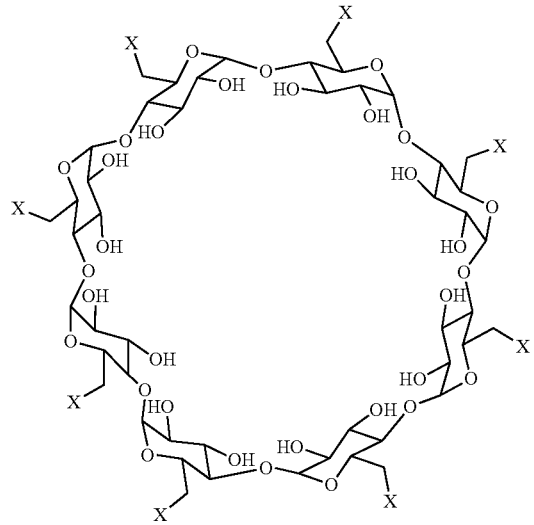
(II)

wherein X is F, Cl, Br and Iodine;

(ii) reacting the 6-perdeoxy-6-per-halo Gamma Cyclodextrin of formula-II with 3-mercapto propionic acid in presence of alkali metal alkoxide in an organic solvent to obtain Sugammadex sodium.

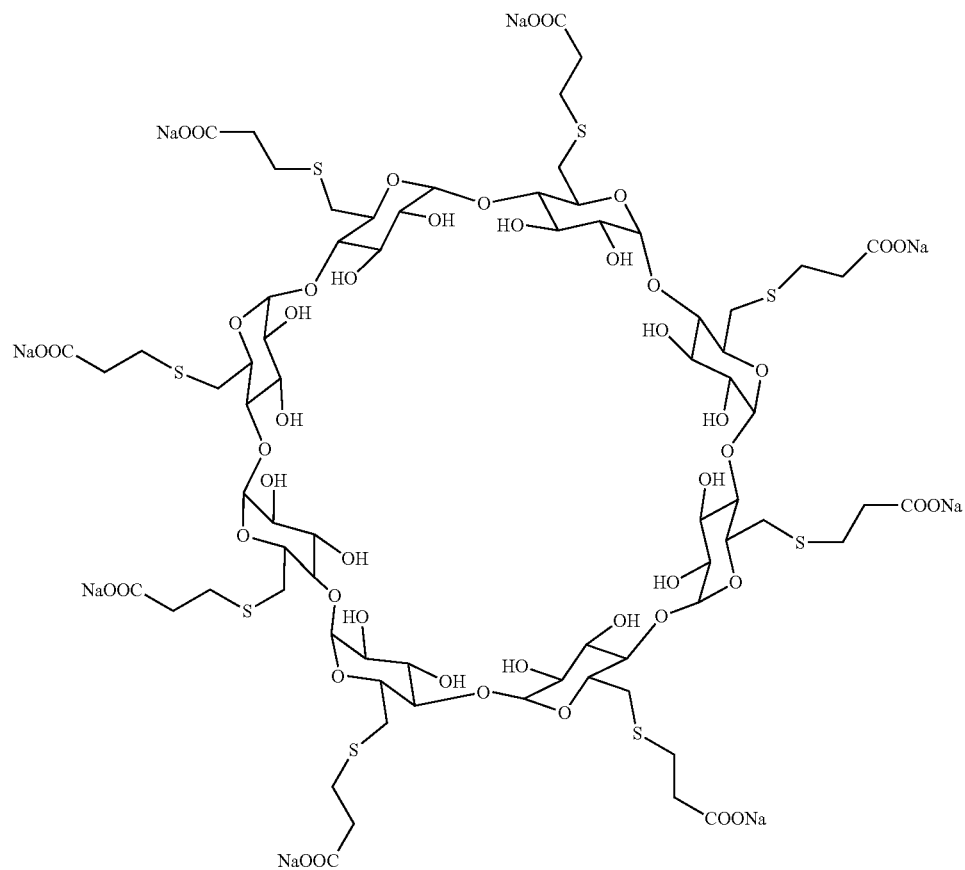

The phosphorous halide in step (i) may be selected from the reagents $PX_5$ or $PX_3$, wherein X is Fluorine (F), chlorine (Cl), Bromine (Br) or Iodine (I). Preferably Chlorine (Cl).

The organic solvent in step (i) may be selected from polar organic solvents such as C1-5 esters, acetonitrile, dimethylformamide, dimethylsulfoxide. Preferably the organic solvent is dimethylformamide or a mixture of dimethylformamide and polar organic solvents such as C1-5 esters, acetonitrile and dimethylsulfoxide.

The alkali metal alkoxide in step (ii) may be selected from the group comprising of sodium methoxide, potassium methoxide, sodium tertiary butoxide, potassium tertiary butoxide, or mixtures thereof.

The organic solvent in step (ii) may be selected from the group comprising of polar aprotic solvents such as dimethylsulfoxide, dimethylacetamide, dimethyl formamide and the like; alcohol solvents such as methanol, ethanol, n-propanol, isopropanol and n-butanol and the like; hydrocarbon solvents such as benzene, toluene, xylene, heptane, hexane and cyclohexane; ether solvents such as di-tert-butylether, diethylether, diisopropyl ether, 1,4-dioxane, methyltert-butylether, ethyl tert-butyl ether, tetrahydrofuran and dimethoxyethane and mixtures thereof. The prior arts disclose the preparation of Sugammadex from the reaction of 6-perdeoxy-6-per-halo Gamma Cyclodextrin of formula-II with 3-mercapto propionic acid in presence of metal hydride in an organic solvent. The inventors of the present invention found difficulty in handling metal hydride in large scale preparations and also found difficulty in working up the process after completion of the reaction.

Surprisingly the inventors of the present invention found that it was easy to handle the large scale operations when they used alkali metal alkoxides in the process for the preparation of Sugammadex from 6-perdeoxy-6-per-halo Gamma Cyclodextrin of formula-II. The resulted reaction mixture in such reaction was easy for work up after the completion of the reaction.

In a second embodiment, the invention provides a process for preparing Sugammadex sodium comprising the step of reacting 6-perdeoxy-6-per-halo-gamma-cyclodextrin with 3-mercapto propionic acid in presence of alkali metal alkoxide in an organic solvent, wherein halogen is fluorine (F), chlorine (Cl), bromide (Br) or iodine (I).

The alkali metal alkoxide in step (ii) may be selected from the group comprising of sodium methoxide, potassium methoxide, sodium tertiary butoxide, potassium tertiary butoxide, or mixtures thereof.

The organic solvent in step (ii) may be selected from the group comprising of polar aprotic solvents such as dimethylsulfoxide, dimethylacetamide, dimethyl formamide and the like; alcohol solvents such as methanol, ethanol, n-propanol, isopropanol and n-butanol and the like; hydrocarbon solvents such as benzene, toluene, xylene, heptane, hexane and cyclohexane; ether solvents such as di-tert-butylether, diethylether, diisopropyl ether, 1,4-dioxane, methyltert-butylether, ethyl tert-butyl ether, tetrahydrofuran and dimethoxyethane and mixtures thereof.

The inventors of the present inventions have tried different purification procedures for the purification of Sugammadex sodium such as silica gel column chromatography, size exclusion chromatography and membrane filtration techniques to get Sugammadex sodium with desired purity. Such purification techniques were not efficient for obtaining pure Sugammadex sodium.

In another embodiment, the present invention provides a process for purification of Sugammadex or its salts which provides unexpected results and is more efficient than the purification techniques known in the art. The process for the purification of Sugammadex or its salts comprises the steps of:

(i) dissolving Sugammadex or its salts in a mixture of water and water miscible solvent;

(ii) adding activated carbon to the solution obtained in step (i) and maintaining for a sufficient time;

(iii) filtering the contents of the mixture obtained in step (ii);

(iv) optionally, heating the filtrate obtained in step (iii);

(v) adding the water miscible solvent to the contents obtained in steps (iii) or (iv); and (vi) cooling the contents obtained in step (v) for sufficient time to obtain a solid.

The water miscible organic solvent in the steps (i) and (v) may be selected from the group comprising of acetonitrile; C1-C4 alcohols such as methanol, ethanol and the likes and/or mixtures thereof.

Some aspects and embodiments of the invention are described in the examples below, which are provided only for the purpose of illustration and are not intended to limit the scope of the invention in any manner.

EXAMPLES

Example 1: Preparation of 6-perdeoxy-6-per-chloro Gamma Cyclodextrin 256.8 g (0.62 Moles) of Phosphorous pentachloride was added to 400 ml of Dimethyformamide (DMF) at 25-30° C. and mixture was maintained for 1 hour at the same temperature. 100 g (0.04 Moles) of Gamma-cyclodextrin was gradually added to the reaction mixture at 25-30° C. under nitrogen. The temperature of the reaction mixture was raised to 65-70° C. and maintained at the same temperature for 14 to 16 hrs. The reaction mixture was then slowly added to chilled water at 0-15° C. The pH of the reaction mass was adjusted to 7-8 with 30% solution of sodium hydroxide in water. The contents were stirred at 25-30° C. at 2 hours. The resultant solid was filtered and washed with water (200 ml). The wet solid was repeatedly washed with purified water at 25-30° C. and dried at 65-70° C. till the moisture level was reduced to less than 4.0%. The yield of the obtained product was 90%

Example 2: Preparation of Sugammadex Sodium

To a mixture of 110.2 g, (15 equ.) 3-mercapto propionic acid and 800 ml Dimethyl formamide (DMF), a 30% solution of sodium methoxide (373.9 g, 30 equ) in methanol was added at 20-25° C. and stirred for 1 hour at the same temperature. The compound from example-1 (100 g) was added to the reaction mixture at 25-30° C. and heated to 75-80° C. and maintained at the 75-80° C. for 12 to 14 hours. After completion of the reaction, the reaction mass was cooled to 20-25° C., then methanol (1000 ml) was added to the reaction mass and stirred for 2 hours at the same temperature. The resultant solid was filtered, washed with methanol (200 ml) and dried for 60-65° C. for 8 hrs.

The crude product was dissolved in water (294 ml) and methanol (294 ml), treated with activated carbon (39.2 g, 20% w/w) and was filtered through celite, washed the carbon cake with purified water (98 ml). The filtrate was heated to 50-55° C. and slowly methanol (2646 ml) was added at the same temperature. The contents were cooled to 20 to 25° C. and stirred for 2 hours at the same temperature. The resulted solid was washed with methanol (200 ml) and dried under vacuum at 60-65° C. for 14 hours. The obtained product had yield of 70.34% and HPLC purity of 99.43%.

Example 3

The Sugammadex prepared from example-2 was dissolved in water (150 ml) and methanol (150 ml), treated with activated carbon (20 g) and filtered the carbon cake through celite bed and the carbon cake was washed with purified water (50 mL). The filtrate was heated to 50-55° C. and added methanol (1350 ml) at the same temperature. The contents were cooled to 20 to 25° C. and stirred for 2 hours at the same temperature. The resultant solid was washed with methanol (200 ml) and dried in vacuum at 70-75° C. for 24 hrs. The obtained yield was 63%.

We claim:

1. An improved process for preparation of Sugammadex sodium wherein the improvement comprises the steps of:

(i) reacting gamma-cyclodextrin having the Formula-I,

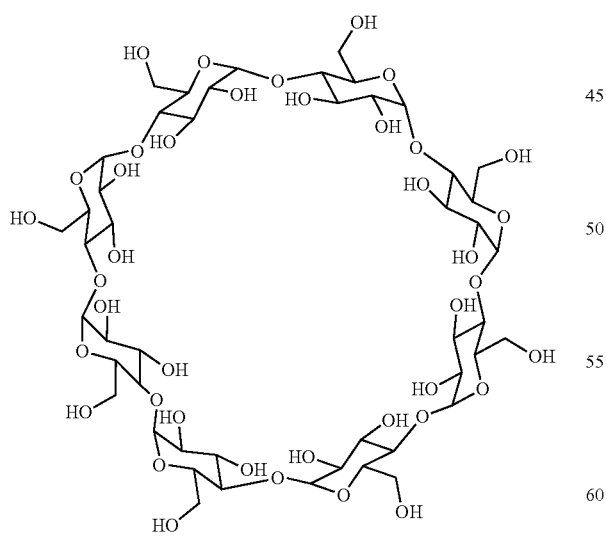

Formula-I with phosphorous halide of Formula $PX_n$ in an organic solvent to obtain 6-perdeoxy-6-per-halo Gamma Cyclodextrin of Formula-II,

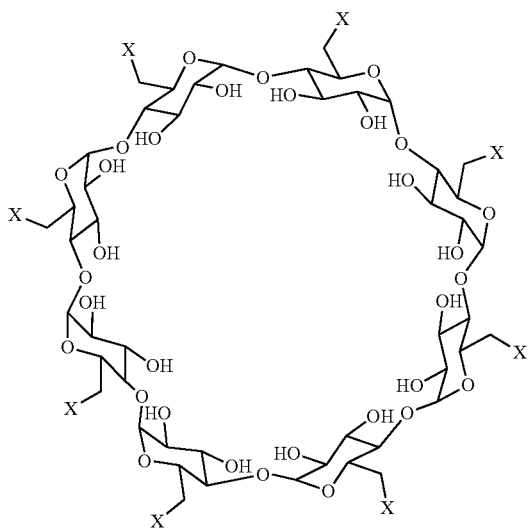

Formula-II wherein X is F or Cl or Br or Iodine and n is 3 or 5; and (ii) reacting the 6-perdeoxy-6-per-halo Gamma Cyclodextrin of Formula-II with 3-mercapto propionic acid in presence of 30% sodium methoxide in methanol and dimethyl formamide to obtain Sugammadex sodium

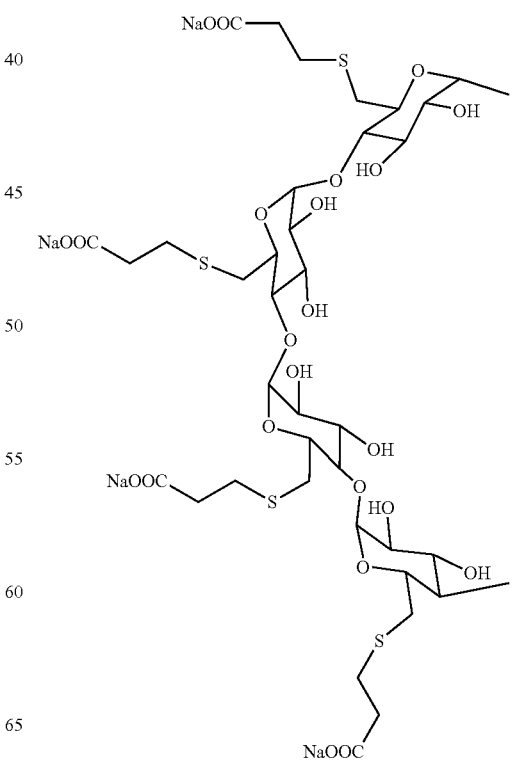

-continued

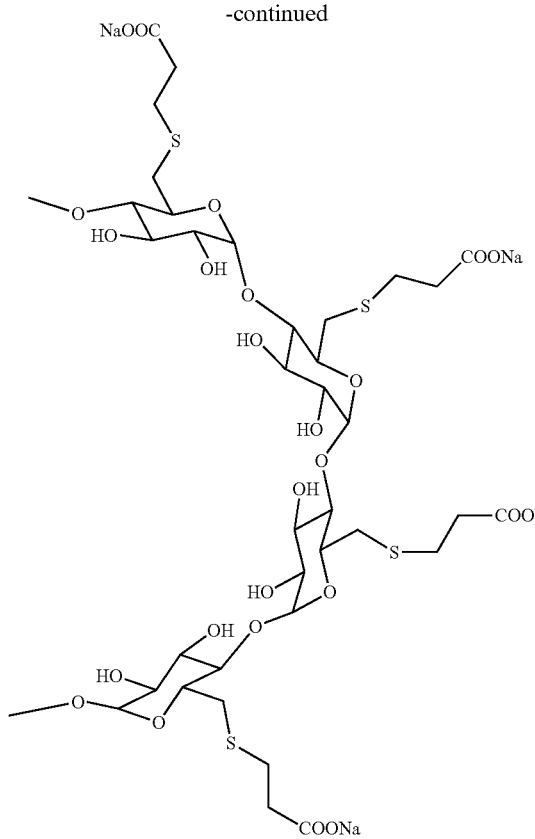

2. The process as claimed in claim 1, wherein said phosphorous halide is selected from the reagents PCl₅ or PCl₃.

3. The process as claimed in claim 1, wherein said organic solvent in step (i) is selected from polar organic solvents.

4. The process as claimed in claim 3, wherein said polar organic solvent in step (i) is dimethyl formamide.

5. A process for preparing Sugammadex sodium comprising the step of reacting 6-perdeoxy-6-per-halo-gamma-cyclodextrin of Formula II,

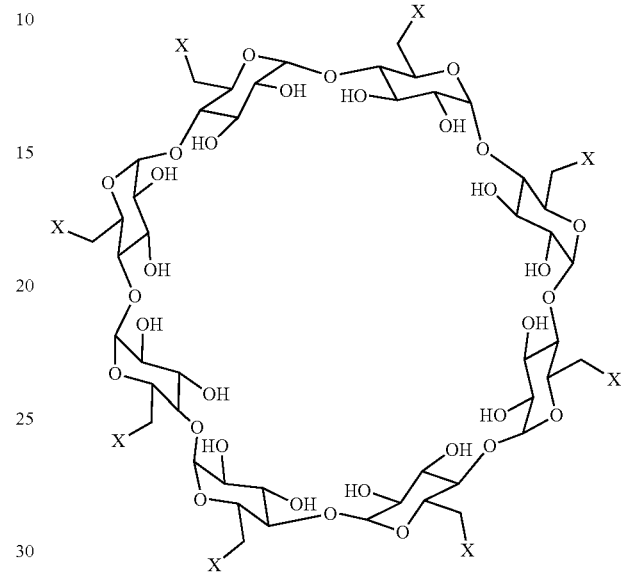

wherein X is Cl; with 3-mercapto propionic acid in presence of 30% sodium methoxide in methanol and dimethyl formamide.

* * * * *